United States Patent [19]

Tamaoki et al.

[11] Patent Number: 5,458,150
[45] Date of Patent: Oct. 17, 1995

[54] SOLENOID VALVE DEVICE

[75] Inventors: Akifumi Tamaoki, Aichi; Toshiaki Yamamoto; Akira Yamamoto, both of Toyota, all of Japan

[73] Assignee: Toyota Jidosha Kabushiki Kaisha, Toyota, Japan

[21] Appl. No.: 251,295

[22] Filed: May 31, 1994

[30] Foreign Application Priority Data

Jun. 3, 1993 [JP] Japan ..................................... 5-133542

[51] Int. Cl.⁶ ............................. F15B 13/06; F16K 11/24
[52] U.S. Cl. .................. 137/596.17; 137/884; 303/119.2
[58] Field of Search .............................. 137/596.17, 884; 303/119.2; 335/259, 267

[56] References Cited

U.S. PATENT DOCUMENTS

| | | | |
|---|---|---|---|
| 2,635,138 | 4/1953 | Reisner | 335/267 |
| 2,831,649 | 4/1958 | Hayslett | 251/129.2 |
| 4,785,848 | 11/1988 | Leiber | 137/596.17 |
| 5,009,250 | 4/1991 | Kline et al. | 137/596.17 |

FOREIGN PATENT DOCUMENTS 2-060780  5/1990  Japan .
2-256979  10/1990  Japan .

Primary Examiner—Gerald A. Michalsky
Attorney, Agent, or Firm—Oliff & Berridge

[57] ABSTRACT

A solenoid valve device includes: a yoke of magnetic material; a plurality of solenoid valves integrally arranged on the yoke, the solenoid valves being actuated by supplying electric current thereto; and a plurality of magneto-resistant portions formed in the yoke at intermediate portions between two adjacent solenoid valves among the plurality of solenoid valves, the plurality of magneto-resistant portions preventing a magnetic field produced within each of the plurality of solenoid valves from influencing the other solenoid valves adjacent to each solenoid valve.

10 Claims, 6 Drawing Sheets

SOLENOID VALVE DEVICE

BACKGROUND OF THE INVENTION (1) Field of the Invention

The present invention generally relates to a solenoid valve device, and more particularly to a solenoid valve device of an antilock brake system for automotive vehicle.

(2) Description of the Related Art

An antilock brake system (ABS) of an automotive vehicle is known. The antilock brake system promotes the stability and controllability of the vehicle during operation when the vehicle is braked. In a proposed solenoid valve device of the antilock brake system, a plurality of solenoid valves are arranged on a block, and the block includes oil passages. A master cylinder is connected to four wheel cylinders through the oil passages. The wheel cylinders are arranged to carry out the braking operations of the four wheels of the vehicle by means for producing the oil pressure. The oil pressure in each of the wheel cylinders is controlled by actuating the solenoid valves.

The ABS actuator is usually composed of eight solenoid valves, and the braking operation of each of the four wheels of the vehicle is controlled by actuating two solenoid valves among the eight solenoid valves. The oil pressure is produced at the master cylinder owing to the force of operating a brake pedal, and the master cylinder supplies the oil pressure to the wheel cylinders via the respective oil passages, in order to perform the braking operation of the four wheels. One of the two solenoid valves mentioned above is a pressure holding valve for holding the oil pressure at the wheel cylinder, and the other is a pressure reducing valve for reducing the oil pressure at the wheel cylinder. Thus, the four pressure holding valves and the four pressure reducing valves are arranged in the ABS actuator.

There is the need for a smaller solenoid valve device since the mounting space of the automotive vehicle is limited. A large mounting space becomes necessary if various solenoid valves are separately arranged within the automotive vehicle.

Japanese Laid-Open Patent Application No. 2- 256979 discloses a proposed solenoid valve device in which a plurality of solenoid valves are arranged on a single block. The purpose of the proposed solenoid valve device is to satisfy the need for a smaller solenoid valve device. Each of the plurality of solenoid valves is composed of a solenoid coil and a valve member free to slide along the coil axis under the influence of the magnetic field. A control circuit which supplies electric current to the respective solenoid valves is provided in the proposed device. The magnetic field within each of the solenoid valves is established by a flow of the electric current from the control circuit, so as to control the solenoid valves, independently of each other, in accordance with the locking conditions of the respective wheels of the automotive vehicle.

In the proposed solenoid valve device mentioned above, the plurality of solenoid valves and the control circuit for controlling the solenoid valves are arranged to satisfy the need for a smaller device. However, when one solenoid valve is operated by supplying electric current to the coil of that solenoid valve, the magnetic flux of the magnetic field produced within that solenoid valve may leak to the other solenoid valves, adjacent to that solenoid valve, arranged on the block. Thus, the other adjacent solenoid valves on the block may be erroneously operated by the leaking magnetic flux. It is difficult for the proposed solenoid valve device to prevent the magnetic flux of the operated solenoid valve from leaking to the adjacent solenoid valves.

SUMMARY OF THE INVENTION

Accordingly, it is a general object of the present invention to provide a solenoid valve device in which the above described problem is eliminated.

Another, more specific object of the present invention is to provide a solenoid valve device in which a plurality of high-magneto-resistant portions are formed at locations between two adjacent solenoid valves among a plurality of solenoid valves arranged on a yoke, to thereby prevent the magnetic flux produced within each solenoid valve from leaking to the other adjacent solenoid valves.

The above mentioned objects of the present invention are achieved by a solenoid valve device which includes: a yoke of magnetic material; a plurality of solenoid valves arranged on the yoke, the solenoid valves being actuated by supplying electric current thereto; and a plurality of magneto-resistant portions formed in the yoke at intermediate portions between two adjacent solenoid valves among the plurality of solenoid valves, the plurality of magneto-resistant portions preventing a magnetic field produced within each of the plurality of solenoid valves from influencing the other solenoid valves adjacent to each solenoid valve.

According to the present invention, it is possible to prevent the erroneous operation of the solenoid valves due to the leakage of the magnetic flux from one solenoid valve to the other adjacent solenoid valves. In the solenoid valve device of the present invention, the plurality of solenoid valves arranged on the yoke can correctly open and close the oil passages of the antilock brake system with no operating errors.

BRIEF DESCRIPTION OF THE DRAWINGS

The other objects, features and advantages of the present invention will be more apparent from the following detailed description when read in conjunction with the accompanying drawings in which.

DESCRIPTION OF THE PREFERRED EMBODIMENT

Figure 1:
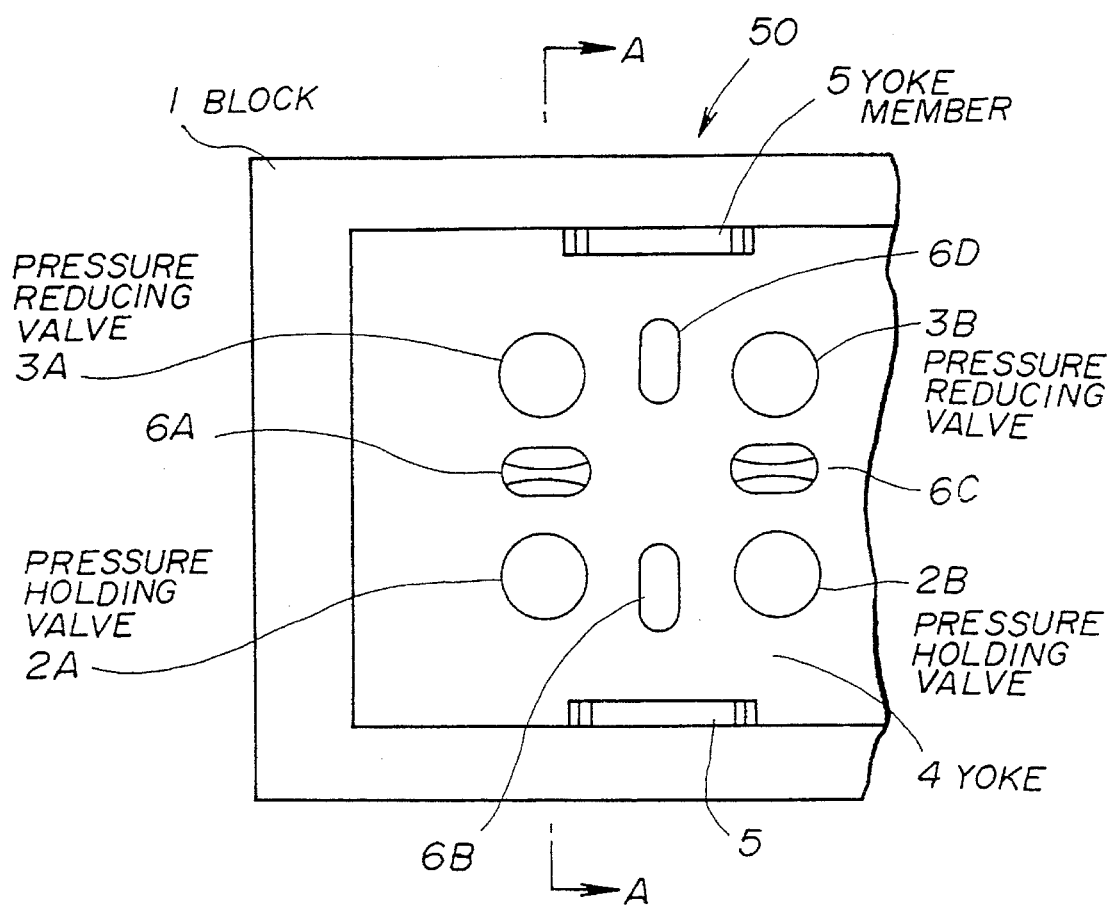
FIG. 1 is a plan view showing a preferred embodiment of the solenoid valve device according to the present invention.
Figure 2:
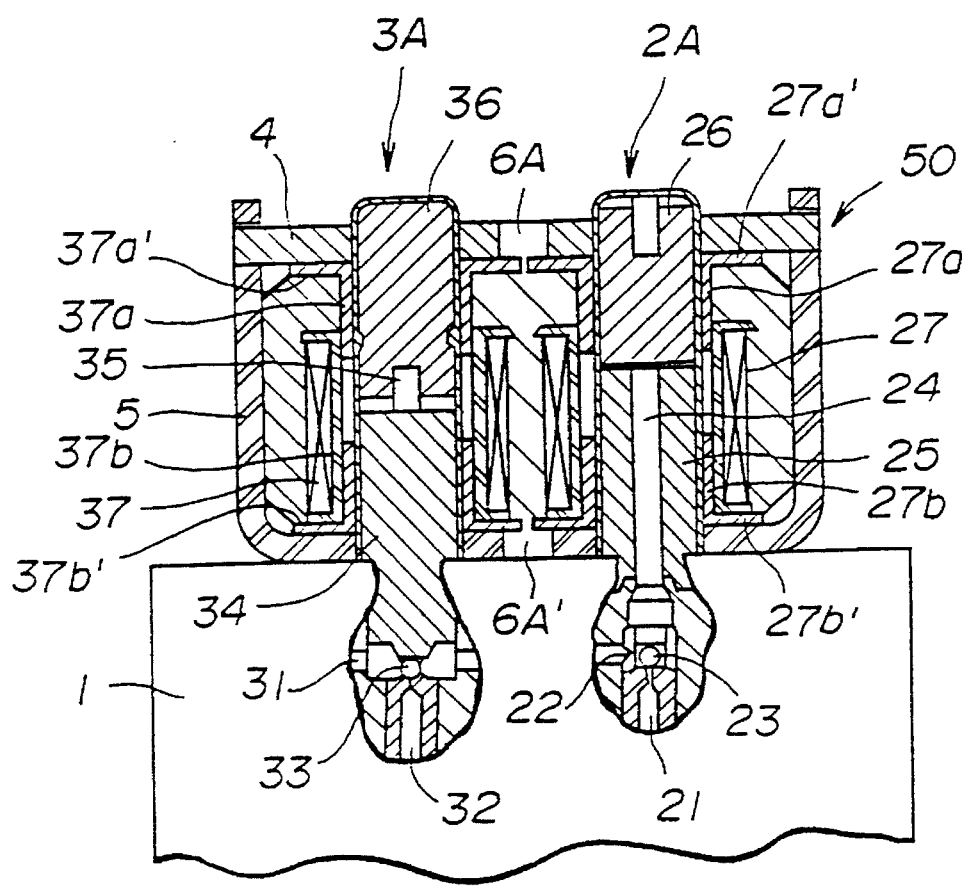
FIG. 2 is a sectional view of the solenoid valve device taken along a line A—A in FIG. 1.

A description will now be given, with reference to FIGS. 1 and 2, of a preferred embodiment of the present invention. FIG. 1 shows a solenoid valve device of an antilock brake system (ABS) according to the present invention. FIG. 2 is a sectional view of the solenoid valve device taken along a line A—A in FIG. 1.

In FIG. 1, there is shown a block 1, and the block 1 contains a plurality of oil passages through which the oil pressure is supplied from a master cylinder (not shown) to a plurality of wheel cylinders (not shown). A plurality of solenoid valves are arranged at their lower ends within the block 1. The solenoid valves are arranged at their upper ends on a yoke 4. The yoke 4 is made of magnetic material, and is held by a yoke member 5 having a U-shaped cross-section. The yoke member 5 is mounted on the block 1.

The plurality of solenoid valves are composed of a number of pressure holding valves 2A, 2B, . . . , and a corresponding number of pressure reducing valves 3A, 3B, . . . In the embodiment in FIGS. 1 and 2, four solenoid valves 2A, 2B, 3A and 3B are arranged in the solenoid valve device. The valves 2A, 2B . . . , and 3A, 3B, . . . are arranged in rows and columns or columns and rows, depending on the vantage point. The pressure holding valves 2A and 2B serve to hold the oil pressure at the wheel cylinders. The pressure reducing valves 3A and 3B serve to reduce the oil pressure at the wheel cylinders.

In FIG. 1, the pressure holding valve 2A and the pressure reducing valve 3A constitute a pair of control valves controlling the oil pressure to a corresponding one of the wheel, cylinders, and the pressure holding valve 2B and the pressure reducing valve 3B constitute a pair of control valves controlling the oil pressure to a corresponding wheel cylinder.

In the yoke 4 on which the upper end portions of the solenoid valves 2A, 2B, 3A and 3B are arranged, a plurality of high-magneto-resistant portions 6A through 6D are formed at intermediate portions between two adjacent solenoid valves among the plurality of the solenoid valves. The high-magneto-resistant portions 6A through 6D in FIG. 1 are, for example, through holes formed in the yoke 2. More specifically, a through hole 6A is formed in the yoke 4 at an intermediate portion between the two adjacent solenoid valves 3A and 2A, a through hole 6B is formed in the yoke 4 at an intermediate portion between the two adjacent solenoid valves 2A and 2B, a through hole 6C is formed in the yoke 4 at an intermediate portion between the two adjacent solenoid valves 2B and 3B, and a through hole 6D is formed in the yoke 4 at an intermediate portion between the two adjacent solenoid valves 3A and 3B.

In the bottom surface of the yoke member 5 which surface comes into contact with the block 1, four through holes are formed at portions corresponding to the portions of the through holes 6A through 6D of the yoke 4. In FIG. 2, only a through hole 6A' in the yoke member 5 at a location corresponding to the location of the through hole 6A is shown, for the sake of convenience.

Next, the structure of the pressure holding valves will be described. As the pressure holding valves 2A and 2B in FIG. 1 have the same structure, a description of only the pressure holding valve 2A will be given.

In FIG. 2, the pressure holding valve 2A is provided with an inlet port 21 and an outlet port 22. The inlet port 21 communicates with the master cylinder (not shown) of the antilock brake system. The outlet port 22 communicates with an oil passage connected to the pressure reducing valve 3A. A ball valve 23 is arranged between the inlet port 21 and the outlet port 22, and the inlet port 21 is closed by the ball valve 23 when the ball valve 23 is depressed.

The pressure holding valve 2A in FIG. 2 includes a needle 24, a hollow magnetic member 25, a metal core 26, and a solenoid coil 27. The needle 24 is inserted into the magnetic member 25, and is vertically slidable along the longitudinal axis of the pressure holding valve 2A. The hollow magnetic member 25 is fixed to the pressure holding valve 2A, and it is stationary. The metal core 26 is separate from the magnetic member 25, and is vertically slidable along the longitudinal axis of the valve 2A. When the metal core 26 is moved downward, the metal core 26 can slide to the top of the magnetic member 25. The upper end of the needle 24 is fixed to the metal core 26. The lower end of the needle 24 is placed onto the ball valve 23. The solenoid coil 27 is arranged outside the magnetic member 25 at the surrounding portion of the metal core 26.

In the pressure holding valve 2A in FIG. 2, the ball valve 23 is moved up and down in accordance with a vertical movement of the needle 24, and the ball valve 23 serves as a check valve for opening and closing the inlet port 21. When the inlet port 21 is open, the master cylinder (not shown) communicates with the oil passage, connected to the pressure reducing valve 3A, through the ball valve 23. When the inlet port 21 is closed by the ball valve 23, the oil passage from the master cylinder to the pressure reducing valve 3A is closed off by the pressure holding valve 2A.

When electric current is supplied to the solenoid coil 27, a magnetic field in the axial direction of the pressure holding valve 2A is established by the flow of the electric current. An axial magnetic flux passing through the magnetic member 25 and the metal core 26 is produced. As the magnetic member 25 is fixed to the pressure holding valve 2A, the metal core 26 is attracted toward the magnetic member 25 under the influence of the magnetic field, to cause the needle 24 to move downward. The ball valve 23 is thus depressed by the needle 24 to close the inlet port 21.

When the supply of electric current to the solenoid coil 27 is off, no magnetic field is established in the axial direction of the pressure holding valve 2A. The ball valve 23 is not depressed by the needle 24, and the ball valve 23 is free to slide along the longitudinal axis of the pressure holding valve 2A. If the oil pressure on the side of the inlet port 21 becomes higher than the oil pressure on the side of the outlet port 22, the inlet port 21 is opened, so that the master cylinder communicates with the oil passage, connected to the pressure reducing valve 3A, through the ball valve 23.

Accordingly, when the supply of electric current to the pressure holding valve 2A is off, the oil pressure from the master cylinder is transmitted to the oil passage (leading to the pressure reducing valve 3A) via the pressure holding valve 2A. On the other hand, when electric current is supplied to the pressure holding valve 2A, the oil passage from the master cylinder to the pressure reducing valve 3A is closed off by the pressure holding valve 2A, and no oil pressure is transmitted to the oil passage on the side of the outlet port 22.

Next, the structure of the pressure reducing valves will be described. As the pressure reducing valves 3A and 3B in FIG. 1 have the same structure, a description of only the pressure reducing valve 3A will be given.

In FIG. 2, the pressure reducing valve 3A is provided with a transverse oil passage 31 and an outlet port 32. The oil passage 31 is transversely extending across the pressure reducing valve 3A. The oil passage 31 at one end (on the right side of the valve 3A in FIG. 2) communicates with the outlet port 22 of the valve 2A, and the oil passage 31 at the other end (on the left side of the valve 3A in FIG. 2) communicates with a corresponding wheel cylinder (not shown). The outlet port 32 communicates with a reservoir tank (not shown). Thus, the outlet port 22 of the pressure holding valve 2A communicates with the corresponding wheel cylinder via the pressure reducing valve 3A.

The pressure reducing valve 3A in FIG. 2 includes a ball valve 33, a plunger 34, a spring 35, a metal core 36, and a solenoid coil 37. The pressure reducing valve 3A controls a flow of the oil from the oil passage 31 to the outlet port 32 by moving the ball valve 33 up and down in accordance with a vertical movement of the plunger 34 under the influence of the magnetic field.

In the pressure reducing valve 3A in FIG. 2, the plunger 34 is made of magnetic material, and is vertically slidable along the longitudinal axis of the valve 3A. The ball valve 33-is placed onto the outlet port 32, and the lower end of the plunger 34 is positioned on the ball valve 33. The metal core 36 is separate from the plunger 34, and is fixed to the pressure reducing valve 3A. The metal core 36 is stationary and the plunger 34 is slidable. The lower end of the metal core 36 is connected to the upper end of the plunger 34 through the spring 35. Thus, the plunger 34 is downwardly biased by the spring 35 so as to press the ball valve 33 against the outlet port 32. The solenoid coil 37 is arranged outside the metal core 36 at the surrounding portion of the metal core 36.

In the pressure reducing valve 3A in FIG. 2, the ball valve 33 is moved up and down in accordance with a vertical movement of the plunger 34, and the ball valve 33 serves as a check valve for opening and closing the outlet port 32. When the outlet port 32 is open, the oil passage 31 from the corresponding wheel cylinder communicates with the reservoir tank via the pressure reducing valve 3A. When the outlet port 32 is closed by the ball valve 33, the oil passage 31 from the master cylinder communicates with the corresponding wheel cylinder via the pressure reducing valve 3A.

When the supply of electric current to the solenoid coil 37 is off, no magnetic field is established. The ball valve 33 is depressed on the outlet port 32 by the plunger 34 due to the force of the spring 35, and the outlet port 32 is closed off by the ball valve 33. The oil passage 31 from the master cylinder at this time communicates with the corresponding wheel cylinder via the pressure reducing valve 3A.

On the other hand, when the electric current is supplied to the solenoid coil 37, the axial magnetic field is established. An axial magnetic flux passing through the plunger 34 and the metal core 36 is produced. As the metal core 36 is fixed to the pressure reducing valve 3A, the plunger 34 is attracted toward the metal core 36 under the influence of the magnetic field, to cause the plunger 34 to move upward. The outlet port 32 is not depressed by the ball valve 33, and the outlet port 32 thus becomes open. The oil passage 31 from the corresponding wheel cylinder at this time communicates with the outlet port 32 leading to the reservoir tank.

Accordingly, when the supply of electric current to the pressure reducing valve 3A is off, the oil pressure at the outlet port 22 of the valve 2A is supplied to the corresponding wheel cylinder through the pressure reducing valve 3A. If the electric current is supplied to the pressure reducing valve 3A after the oil pressure is supplied to the wheel cylinder, the oil pressure at the wheel cylinder is reduced since the oil at the wheel cylinder is returned to the reservoir tank via the outlet port 32 of the pressure reducing valve 3A.

When no electric current is supplied to the solenoid valves 2A and 3A, the oil pressure at the master cylinder is supplied to the corresponding wheel cylinder through the solenoid valves 2A and 3A if a brake pedal (not shown) is operated at this time. The electric current is supplied to the solenoid valve 2A after the oil pressure at the master cylinder is supplied to the wheel cylinder, and the oil pressure at the wheel cylinder is held by the solenoid valve 2A. The electric current is supplied to the solenoid valve 3A after the oil pressure at the wheel cylinder is held by the solenoid valve 2A, the oil pressure is returned from the wheel cylinder to the reservoir tank so that the oil pressure is reduced.

In the pressure holding valve 2A in FIG. 2, a yoke inner member 27a of magnetic material is arranged inside the solenoid coil 27 at the upper end of the solenoid coil 27, and a yoke inner member 27b of magnetic material is arranged inside the solenoid coil 27 at the lower end of the solenoid coil. 27. The yoke inner member 27a has a flange 27a' which is brought into contact with the bottom surface of the yoke 4. The yoke inner member 27b has a flange 27b' which is brought into contact with the inner bottom surface of the yoke member 5.

In the pressure reducing valve 3A in FIG. 2, a yoke inner member 37a of magnetic material is arranged inside the solenoid coil 37 at the upper end of the solenoid coil 37, and a yoke inner member 37b of magnetic material is arranged inside the solenoid coil 37 at the lower end of the solenoid coil, 37. The yoke inner member 37a has a flange 37a' which is brought into contact with the bottom surface of the yoke 4. The yoke inner member 37b has a flange 37b' which is brought into contact with the inner bottom surface of the yoke member 5.

As shown in FIG. 2, the yoke inner members 27a and 37a at the upper ends of the solenoid coils 27 and 37 are arranged in such a manner that the yoke inner members 27a and 37a do not come into contact with each other. The yoke inner members 27b and 37b at the lower ends of the solenoid coils 27 and 37 are arranged in such a manner that the yoke inner members 27b and 37b do not come into contact with each other.

Next, a description will be given of the operation of the solenoid valve device according to the present invention. The ABS actuator performs the braking operation of a corresponding wheel cylinder by supplying electric current to a corresponding pair of the pressure holding valve and the pressure reducing valve. As the braking operation of each the wheel cylinders by means of the respective pairs of the pressure holding valve and the pressure reducing valve is essentially the same as each other, the operation of the solenoid valve device 50 when only the pair of the pressure holding valve 2A and the pressure reducing valve 2B is used will be described for the sake of convenience.

When the supply of electric current to the pressure holding valve 2A and to the pressure reducing valve 3A is off, the inlet port 22 of the pressure holding valve 2A is open and the outlet port 32 of the pressure reducing valve 3A is closed. The master cylinder communicates with the corresponding wheel cylinder via the pressure holding valve 2A, the oil passage 31 and the pressure reducing valve 3A. If the brake pedal (not shown) is operated, the oil pressure at the master cylinder is transmitted to the wheel cylinder through the oil passage 31. A braking force in accordance with the oil pressure at the wheel cylinder acts on the corresponding wheel of the automotive vehicle.

If the ABS actuator operates when the solenoid valve device 50 is under the above condition, the electric current is supplied from the ABS actuator to the pressure holding valve 2A and to the pressure reducing valve 3A.

When the electric current is supplied to the pressure holding valve 2A, the axial magnetic flux passing through the metal core 26 and the magnetic member 25 along the longitudinal axis of the valve 2A is produced. Under the influence of the magnetic field, the metal core 26 is attracted toward the magnetic member 25, and the needle 24 is moved downward by the metal core 26. The ball valve 23 is pressed downward onto the inlet port 21 in accordance with the vertical movement of the needle 24. The transmission of the oil pressure from the master cylinder to the oil passage 31 via the outlet port 22 is stopped by the ball valve 23.

In the solenoid valve device 50 in FIG. 1, the through hole 6B, constituting one of the high-magneto-resistant portions, is formed in the yoke 4 at the intermediate portion between the two adjacent solenoid valves 2A and 2B, and a through hole (not shown) is formed in the yoke member 5 at a location corresponding to the location of the through hole 6B in the yoke 4. It is thus possible to prevent the magnetic field produced within the solenoid valve 2A from influencing the adjacent solenoid valve 2B. Also, the through hole 6A, constituting one of the high-magneto-resistant portions, is formed in the yoke at the intermediate portion between the two adjacent solenoid valves 2A and 3A, and the through hole 6A' is formed in the yoke member 5 at the location corresponding to the location of the through hole 6A in the yoke 4. It is thus possible to prevent the magnetic field produced within the solenoid valve 2A from influencing the adjacent solenoid valve 3A. Hence, the solenoid valve device 50 of the present invention can prevent the erroneous operation of the solenoid valves due to the leakage of the magnetic flux from one solenoid valve to the other adjacent solenoid valves.

When the electric current is supplied to the pressure reducing valve 3A, the axial magnetic flux is produced passing through the metal core 36 and the plunger 34 along the longitudinal axis of the valve 3A. Under the influence of the magnetic field the plunger 34 is attracted toward the metal core 36, and the plunger 34 is moved upward against the biasing force of the spring 35. The ball valve 33 is drawn upward from the outlet port 32 in accordance with the vertical movement of the plunger 34. As the outlet port 32 at this time becomes open, the oil pressure from the wheel cylinder is transmitted to the reservoir tank via the outlet port 32.

In the solenoid valve device 50 in FIG. 1, the through hole 6D, constituting one of the high-magneto-resistant portions, is formed in the yoke 4 at the intermediate portion between the two adjacent solenoid valves 3A and 3B, and a through hole (not shown) is formed in the yoke member 5 at a location corresponding to the location of the through hole 6D in the yoke 4. It is thus possible to prevent the magnetic field produced within the solenoid valve 3A from influencing the adjacent solenoid valve 3B. Also, as described above, the through hole 6A is formed in the yoke 4 at the intermediate portion between the two adjacent solenoid valves 2A and 3A, and the through hole 6A' is formed in the yoke member 5 at the location corresponding to the location of the through hole 6A in the yoke 4. It is thus possible to prevent the magnetic field produced within the solenoid valve 3A from influencing the adjacent solenoid valve 2A. Hence, the solenoid valve device 50 of the present invention can prevent the erroneous operation of the solenoid valves due to the leakage of the magnetic flux from one solenoid valve to the other adjacent solenoid valves.

In the above described embodiment, the high-magneto-resistant portions are formed in the yoke 4 of magnetic material and in the yoke member 5 of magnetic material at the intermediate portions between two adjacent solenoid valves among the plurality of solenoid valves. It is thus possible to prevent the magnetic field produced within each of the plurality of solenoid valves from influencing the other solenoid valves adjacent to the solenoid valve. Therefore, the solenoid valve device according to the present invention can prevent the erroneous operation of the solenoid valves due to the leakage of the magnetic flux from one solenoid valve to the other adjacent solenoid valves.

Further, the present invention is not limited to the above described embodiment, and various variations and modifications may be made without departing from the scope of the present invention.

Figure 3:
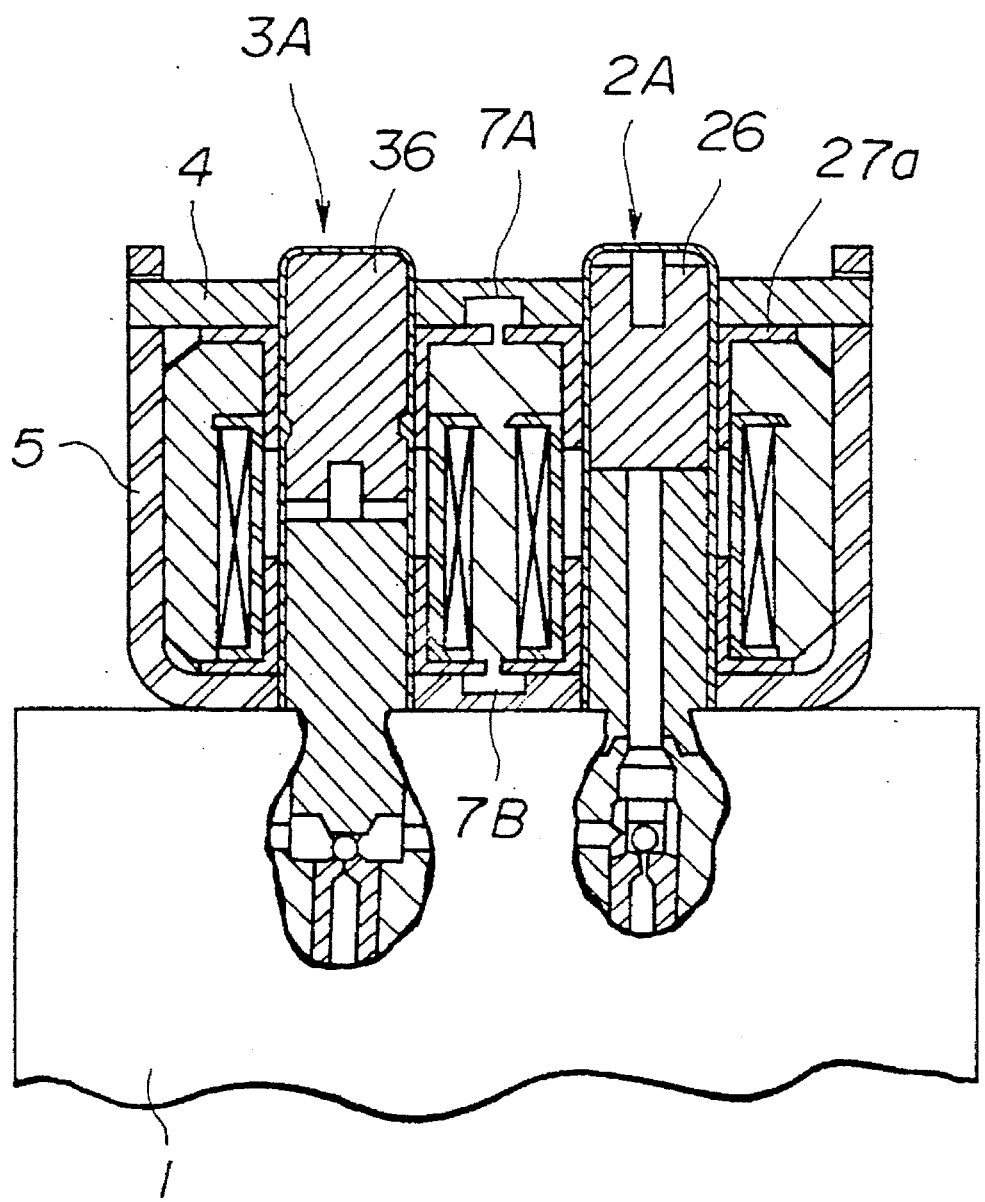
FIG. 3 is a sectional view showing a variation of high-magneto-resistant portions of the solenoid valve device according to the present invention.
Figure 4:
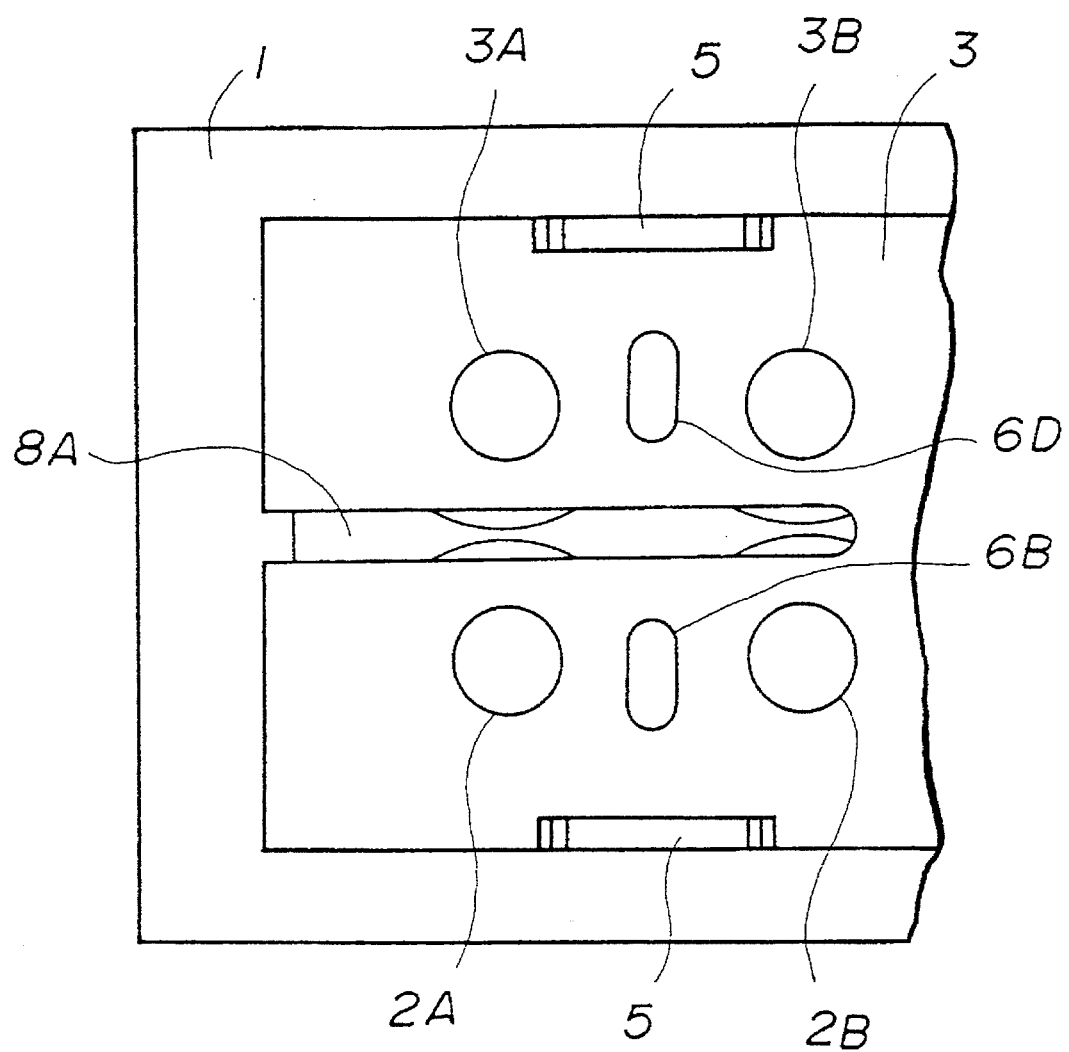
FIG. 4 is a plan view showing another variation of high-magneto-resistant portions of the solenoid valve device according to the present invention.
Figure 5:
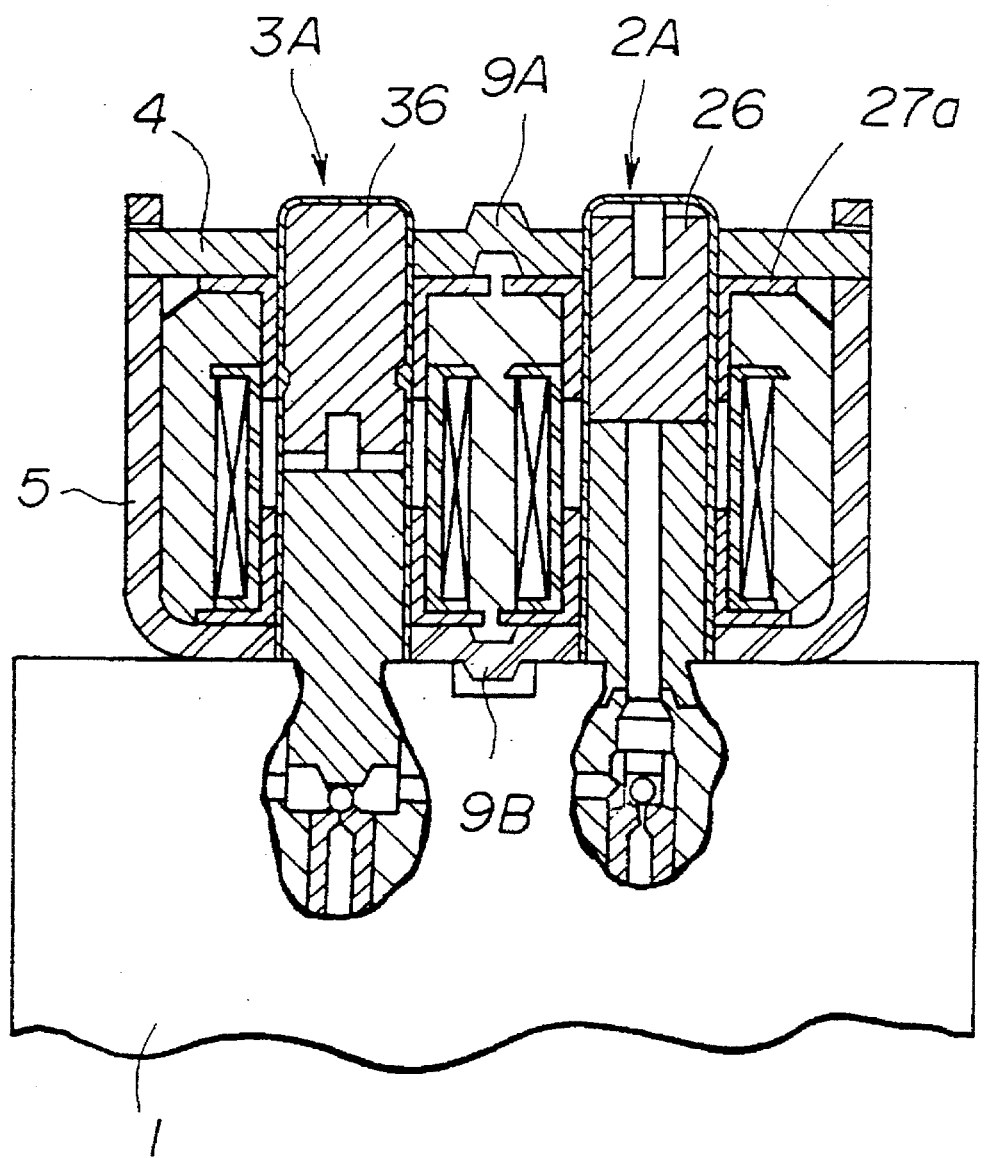
FIG. 5 is a sectional view showing still another variation of high-magneto-resistant portions of the solenoid valve device according to the present invention.
Figure 6:
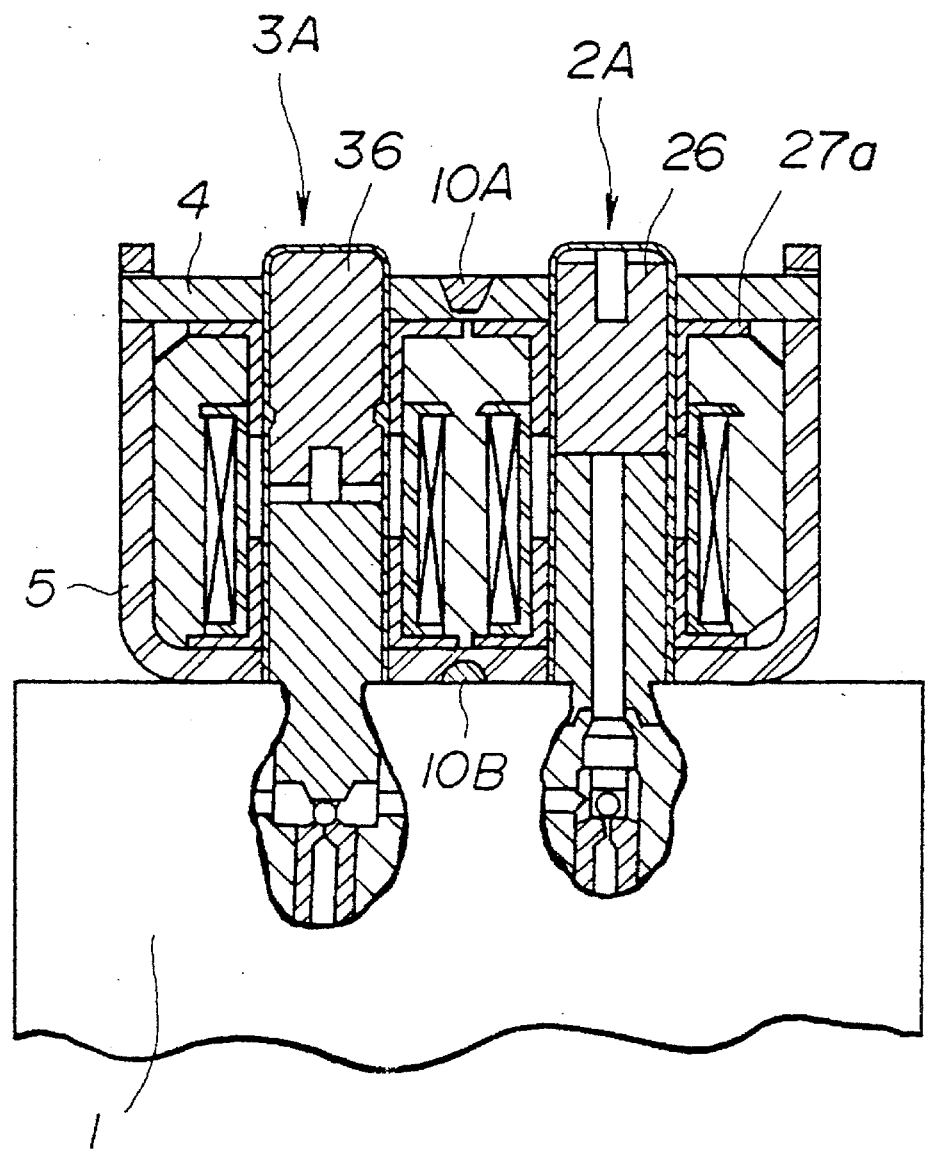
FIG. 6 is a sectional view showing still another variation of high-magneto-resistant portions of the solenoid valve device according to the present invention.

For example, the high-magneto-resistant portions, formed in the yoke at the intermediate portions between two adjacent solenoid valves, are not limited to the through holes 6A–6D in FIG. 1, and various variations and modifications of the high-magneto-resistant portions may be made. The solenoid valve device according to the present invention may have a plurality of thinned wall portions 7A, 7B, . . . , shown in FIG. 3, which are used instead of the through holes 6A–6D in FIG. 1. Also, the solenoid valve device according to the present invention may have an opening 8A, shown in FIG. 4, which is used instead of the through holes 6A and 6C in FIG. 1. Also, the solenoid valve device according to the present invention may have a plurality of half-sheared portions 9A, 9B, . . . , shown in FIG. 5, which are used instead of the through holes 6A–6D in FIG. 1. Also, the solenoid valve device according to the present invention may have a plurality of non-magnetic portions 10A, 10B, . . . , shown in FIG. 6, which are used instead of the through holes 6A–6D in FIG. 1. The non-magnetic portions 10A, 10B, . . . in FIG. 6 are formed by performing heat treatment, such as laser beam hardening, of the local areas of the yoke and the yoke member.

What is claimed:

1. A solenoid valve device, comprising:

a yoke of magnetic material;

a plurality of solenoid valves arranged in a plurality of rows and a plurality of columns on said yoke, said solenoid valves being actuated by supplying electric current thereto; and a plurality of magneto-resistant means formed in said yoke at intermediate portions between adjacent solenoid valves among said plurality of solenoid valves, said plurality of magneto-resistant means corresponding to areas of maximum magnetic field flux density between adjacent solenoid valves wherein a magnetic field produced within each of the plurality of solenoid valves is prevented from influencing the adjacent solenoid valves.

2. A solenoid valve device according to claim 1, wherein said plurality of magneto-resistant means comprise a plurality of through holes formed in the yoke at intermediate portions between adjacent solenoid valves among the plurality of solenoid valves.

3. A solenoid valve device according to claim 2, including a yoke member on which said plurality of solenoid valves are arranged, wherein said plurality of magneto-resistant means further comprise a plurality of through holes formed in said yoke member at intermediate portions between adjacent solenoid valves among the plurality of solenoid valves.

4. A solenoid valve device according to claim 1, including a yoke member on which said plurality of solenoid valves are arranged, wherein said plurality of magneto-resistant means comprise a plurality of through holes formed in said yoke member at intermediate portions between adjacent solenoid valves among the plurality of solenoid valves.

5. A solenoid valve device according to claim 1, wherein said solenoid valves are arranged on the yoke in two rows, one of said two rows of said solenoid valves including a number of pressure holding valves, and the other row of said solenoid valves comprising a corresponding number of pressure reducing valves.

6. A solenoid valve device according to claim 1, further comprising a yoke member on which said solenoid valves are arranged, said yoke member including a plurality of magneto-resistant means formed in said yoke member at intermediate portions between adjacent solenoid valves among said solenoid valves.

7. A solenoid valve device according to claim 1, wherein said plurality of magneto-resistant means comprise a plurality of thinned wall portions formed in the yoke at intermediate portions between adjacent solenoid valves among the plurality of solenoid valves.

8. A solenoid valve device according to claim 1, wherein said plurality of magneto-resistant means comprise an elongated opening formed in the yoke at intermediate portions between adjacent solenoid valves among the plurality of solenoid valves.

9. A solenoid valve device according to claim 1, wherein said plurality of magneto-resistant means comprise a plurality of half-sheared portions formed in the yoke at intermediate portions between adjacent solenoid valves among the plurality of solenoid valves.

10. A solenoid valve device according to claim 1, wherein said plurality of magneto-resistant means comprise a plurality of non-magnetic portions formed in the yoke at intermediate portions between adjacent solenoid valves among the plurality of solenoid valves.

* * * * *